United States Patent [19]

Hagen

[11] Patent Number: 4,868,694
[45] Date of Patent: Sep. 19, 1989

[54] FLEXURE FOR ROTARY ACTUATED ARM

[75] Inventor: Tracy M. Hagen, Chaska, Minn.

[73] Assignee: Magnetic Peripherals Inc., Minneapolis, Minn.

[21] Appl. No.: 131,615

[22] Filed: Dec. 11, 1987

[51] Int. Cl.4 ............................................. G11B 5/48
[52] U.S. Cl. ................................................... 360/104
[58] Field of Search ................ 360/104, 103, 105, 106

[56] References Cited

U.S. PATENT DOCUMENTS

| | | | |
|---|---|---|---|
| 3,914,792 | 10/1975 | Beecroft | 360/103 |
| 3,931,641 | 1/1976 | Watrous | 360/104 |
| 4,167,765 | 9/1979 | Watrous | 360/103 |
| 4,309,732 | 11/1982 | Kronfeld et al. | 360/104 |
| 4,349,851 | 9/1982 | Higashiyama et al. | 360/105 |
| 4,379,316 | 4/1983 | Krane | 360/105 |
| 4,399,476 | 8/1983 | King | 360/104 |
| 4,449,155 | 5/1984 | Meier et al. | 360/104 |
| 4,620,251 | 10/1986 | Gitzendanner | 360/103 |
| 4,777,551 | 10/1988 | Seki et al. | 360/104 |

FOREIGN PATENT DOCUMENTS 62-1176  1/1987  Japan ................................... 360/104

OTHER PUBLICATIONS

Advertising Flyer/Sales Brochure, "Suspension Assemblies", Hutchinson Technology Type IX Suspension Assembly, Sep. 1987.
"Disk File Rotary Actuator with In-Line Load Beam and Suspension Aligned with Access Path," IBM Technical Disclosure Bulletin, Apr. 1986 (vol. 28, No. 11).

Primary Examiner—John H. Wolff
Assistant Examiner—Matthew J. Bussan
Attorney, Agent, or Firm—Joseph A. Genovese; Richard E. Billion

[57] ABSTRACT

A flexure for a rotary actuated load arm for use in a data storage system is disclosed. The flexure attaches a slider to the load arm. The slider carries a transducer over a track on a disk. The disclosed flexure has a high enough radial stiffness to prevent the slider from sliding and sticking in a position where the transducer cannot read or write data on the desired track.

18 Claims, 3 Drawing Sheets

RADIAL STIFFNESS
YAW
PITCH
ROLL
TIMING STIFFNESS

RANGE OF MOTION

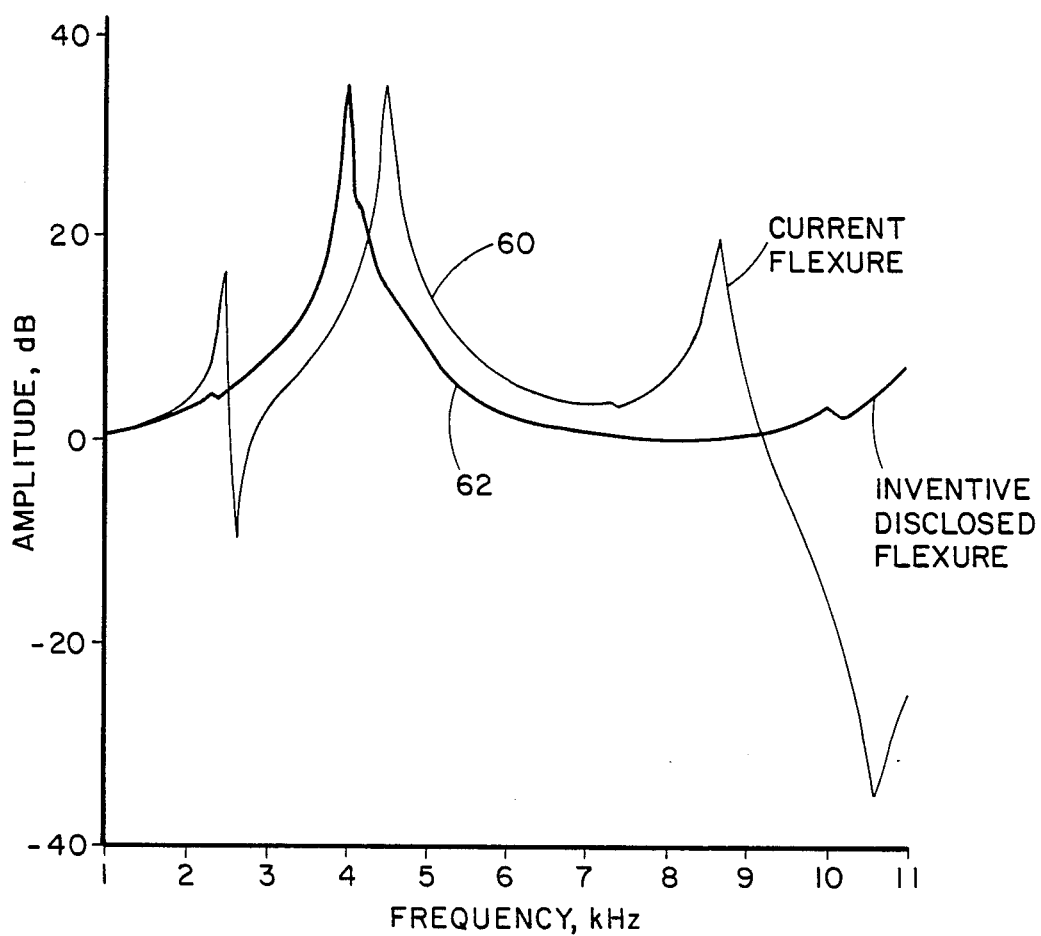

FLEXURE FOR ROTARY ACTUATED ARM

BACKGROUND OF THE INVENTION

In magnetic storage devices a slider is flown over a magnetic disk. The slider contains transducers which write or read the data as the transducer is flown over one of the tracks in the disk.

The flying height of the slider is kept as uniform as possible to minimize read and write errors. Magnetic disks have imperfections. Among the imperfections are variations in the height both along particular tracks and from the inside of the disk to the outside of the disk. In order to maintain a uniform flying height the slider must pitch and roll to accommodate the height variations on the disk. The slider is mounted to an actuator by a gimbal spring or flexure which allows the pitching and rolling motions.

Actuators position sliders over a particular track in one of two ways. Linear actuators move the magnetic head assembly along a radial line from the center of the disk. Rotary actuators swing the magnetic head assembly into position over the track. One advantage a rotary actuator has over a linear actuator is reduced inertia that allows the slider to be positioned over a track more quickly thereby lessening the time necessary to access data. However, the added speed of rotary actuators produces larger accelerations and decelerations as it rotates the slider from position to position. The larger accelerations subject the rotary actuator to larger forces.

Presently, the same flexure used in linear actuators is also used in rotary actuators. Subjecting the same flexure to larger forces produces a problem for rotary actuators. Briefly, the presently used flexure includes a tongue having a gimbal dimple therein. The gimbal dimple is a protrusion extending and contacting the load arm. The gimbal dimple provides a contact point about which the slider can pitch and roll to accomodate variations in the topography of the disk.

The problem with the presently used flexure relates to the radial stiffness or resistance to motion about the radius through which the load arm swings. The radial stiffness is not great enough to prevent the gimbal dimple from sliding to a point on the load arm where the transducer, carried by the slider, is in an off track position where read errors occur. The radial stiffness is also not great enough to overcome the friction force between the load arm and the gimbal dimple when the slider is positioned such that the transducer is off track. Thus, the gimbal dimple slides along the load arm in a radial direction and sticks in an off track position where read errors occur. Hence, the problem is referred to as the stick slip problem.

The flexure presently used is mounted to the load arm in the same manner in both the rotary and the liner actuators. The sliders used are also the same. However, the slider in the rotary actuator is rotated ninety degrees relative to the mounting of the slider to the flexure in the linear actuator. The forces from rotation act along an axis ninety degrees away from the comparable forces in a linear actuator. In addition, these forces are larger due to the quick starts and stops of the rotary actuator. These larger forces combined with switching to a different axis are among the causes of the slip and stick problem. Additional width can be allocated to the track to accommodate the slip and stick problem, however, the data capacity of the disk drops. If the track width is not increased, the number of read errors increases.

Thus, there is a need for a magnetic head assembly for a rotary actuator having a radial stiffness large enough to eliminate the stick slip problem. Rotary actuators could then be used to access data more quickly than linear actuators without increased read errors or sacrificing additional storage space.

SUMMARY OF THE INVENTION

A magnetic head assembly for rotary actuators having a flexure with a radial stiffness high enough to prevent the slider from sticking off track is disclosed. The flexure, made of a thin metal of uniform thickness, has two U-shaped slots therein. The base of the first U-shaped slot is located on one side of the load arm and is parallel to the longitudinal axis of the load arm. The legs of the first U-shaped slot are both perpendicular to the longitudinal axis of the load arm. The second U-shaped slot is located inside the area defined by the first U-shaped slot. The base of the second U-shaped slot is located on the outer side of the load arm and is parallel to the longitudinal axis of the load arm. The legs of the second slot are parallel to the legs of the first U-shaped slot and extend toward the base of the first U-shaped slot. The slider is attached to the area defined by the second U-shaped slot. The flexure is attached to the load arm at each end of the flexure.

BRIEF DESCRIPTION OF THE DRAWINGS

FIG. 7 is a graph of the ratio of the amplitude output to the amplitude input as a function of frequency for both the current flexure and the disclosed inventive flexure.

DETAILED DESCRIPTION OF THE PREFERRED EMBODIMENT

Figure 1:
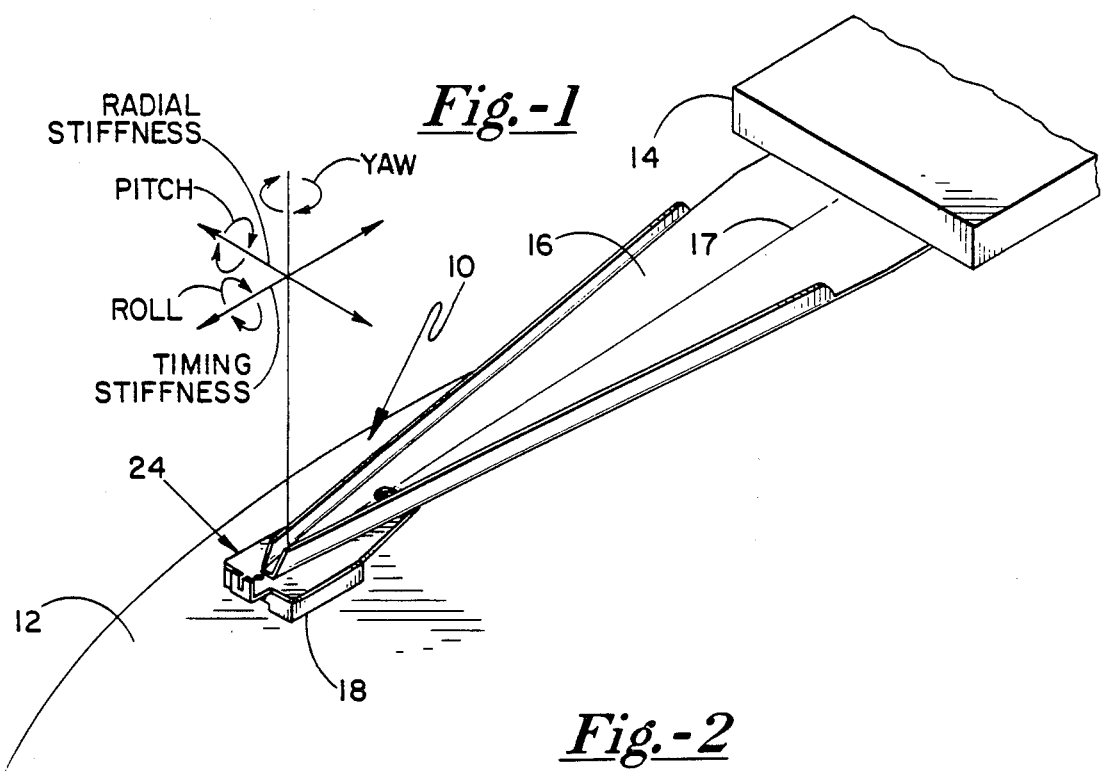
FIG. 1 shows a rotary actuated magnetic arm assembly positioned over a magnetic disk.

FIG. 1 shows a magnetic arm assembly 10 positioned over a magnetic disk 12. A rotary actuator swings the magnetic arm assembly 10 into a position over the disk 12. The magnetic arm assembly includes a fixed base portion 14 and a load arm 16. The load arm has a longitudinal axis 17.

A gimbal spring or flexure 24 connects the slider 18 to the load arm 16. The flexure 24 is spot welded to the load arm 16 and the slider 18 is attached via adhesive to the flexure 24. The slider 18 includes at least one transducer (not shown) which enter reads data from a track or writes data onto a track on the disk 12. When necessary, the magnetic arm assembly 10 rotates to reposition the slider 18 over another track.

Figure 2:
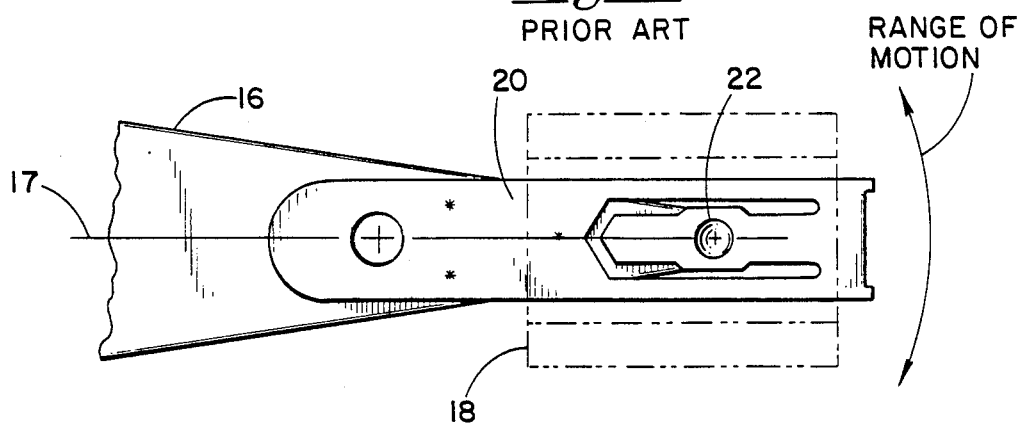
FIG. 2 shows a presently used flexure mounted to a rotary actuated magnetic arm assembly. A slider is shown in phantom.
Figure 3:
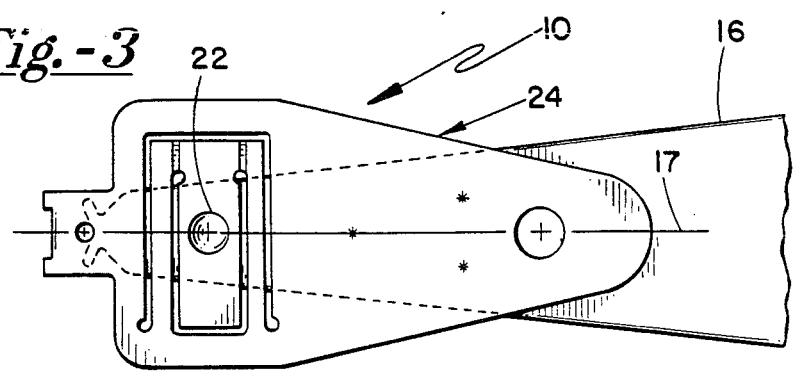
FIG. 3 shows the flexure of the invention mounted to a rotary actuated magnetic arm assembly.
Figure 4:
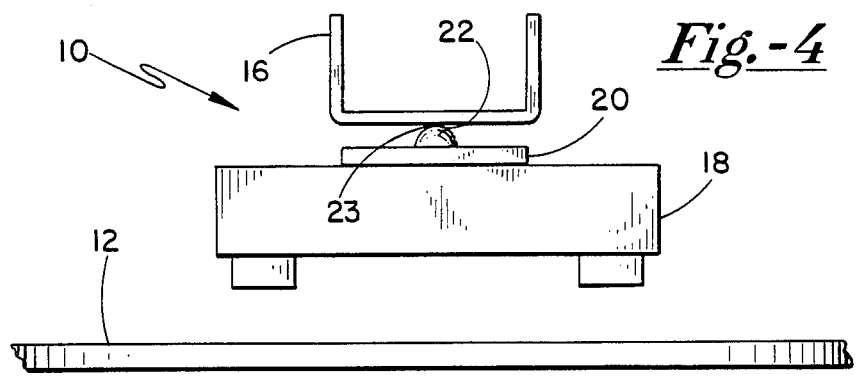
FIG. 4 shows a generalized cross sectional view of a flexure mounted to a magnetic arm assembly.

FIG. 2 shows the presently used, prior art flexure 20 which connects the slider 18 to the load arm 16. FIG. 3 shows a magnetic arm assembly 10 including a new inventive flexure 24. The new inventive flexure 24 is substituted for the flexure 20. Both flexure 20 and flexure 24 allow the sliders to pitch and roll to accommodate the variations in topography across the disk 12. Both flexure 20 and flexure 24 include a gimbal dimple 22 which contacts the load arm 16 at a contact point 23 (shown in FIG. 4). The slider 18 pivots about the contact point 23 as it pitches and rolls.

THE STICK SLIP PROBLEM

The stick slip problem is associated with the prior art flexure 20 when it is used wtih a rotary actuator. The quick starts and stops made by a rotary actuator as the load arm 16 rotates to reposition the slider 18, increase the forces on the slider 18 and cause the gimbal dimple 22 to slide with respect to the load arm 16. The radial stiffness of the presently used flexure 20, mounted as shown in FIG. 2, is not large enough to prevent this sliding. The slider 18 carries a transducer (not shown) which flies over the center of a track when properly positioned. Sliding of the gimbal dimple 22 causes the transducer (not shown) carried by the slider 18 to fly over the edge of a track or over another track on the disk 12. The transducer reads and writes information onto the disk. When the transducer is out of position read errors result.

Figure 5:
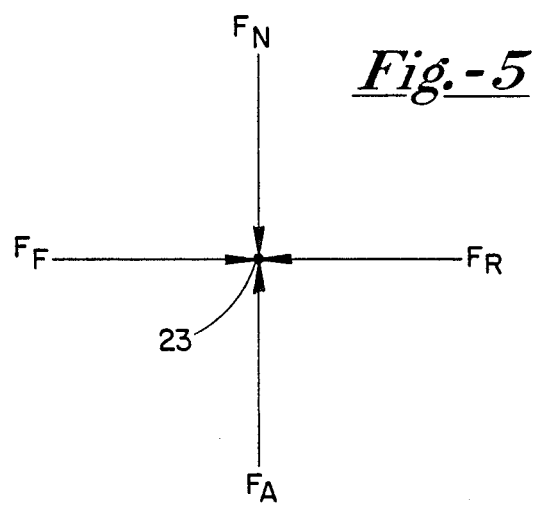
FIG. 5 is a force diagram which shows the forces which act at the point of contact between the load arm and the gimbal dimple.

FIG. 5 shows one example of the forces which act after the gimbal dimple 22 slides with respect to the load arm 16. In FIG. 5, the gimbal dimple 22 and slider 18 have moved to the right. If the gimbal dimple 22 slides left, the forces $F_f$ and $F_R$ would be reversed in FIG. 5. The gimbal dimple 22 remains off center or sticks when the force of friction, $F_f$, is greater than the force of restoration, $F_R$. To produce the force $F_R$ the flexure 20 acts as a spring having a spring constant called the radial stiffness. The radial stiffness is the force produced per unit of angular displacement of the flexure in a direction corresponding to the radius about which the load arm 16 swings. The force, $F_R$, produced is directly related to the radial stiffness as follows:

$$F_R = (\text{radial stiffness}) - \begin{pmatrix} \text{distance gimbal} \\ \text{dimple slides} \\ \text{off center} \end{pmatrix} \quad \text{Equation 1}$$

The load arm 16 produces the normal force, $F_N$, which equals the force, $F_A$, produced by air pressure on the bottom surface of the slider 18. The friction force, $F_f$, between the gimbal dimple 22 and the load arm 16 is directly related to $F_N$ as follows:

$$F_f = \mu F_N \quad \text{Equation 2}$$

where $\mu$ = coefficient of friction between the gimbal dimple and the load arm.

The value of $\mu$, which is approximately equal to 0.5, is substantially constant since the materials making up the load arm 16 and the gimbal dimple 22 stay the same. $F_N$ may vary, thus the maximum friction force would be as follows:

$$F_{fmax} = \mu F_{Nmax} \quad \text{Equation 3}$$

In practice, the gimble dimple 22 will slide on the load arm 16. To prevent data loss or other errors, the radial stiffness of the flexure used must be high enough so that when the gimbal dimple 22 slides with respect to the load arm 16, the transducer (not shown) remains over the desired track in a position where reading and writing can be accomplished without producing read errors. The problem with flexure 20 is that the radial stiffness of flexure 20 allows the gimbal dimple 22 to slide to the edge of the desired track or to an off track position where read errors result.

The maximum distance the gimbal dimple 22 can slide with respect to the load arm 16 and stick is where $R_R$ equals $F_{fmax}$. Setting Equation 1 equal to Equation 3 and solving for distance yields the following:

$$\text{Maximum distance gimbal dimple can slide off center and stick} = \frac{F_{Nmax}}{(\text{radial stiffness})} \quad \text{Equation 4}$$

Thus, to cure the stick slip problem either the quick starts and stops which cause the slider to slip must be eliminated or the radial stiffness of the flexure must be increased so the gimbal dimple can slide, slip and stick while keeping the transducer on track.

Since eliminating the quick starts and stops of the arm assembly 10 would undo one of the main advantages of the rotary actuator, an inventive flexure for a rotary actuator with a higher radial stiffness has been developed. The inventive flexure 24 and its advantages will now be described.

THE INVENTIVE FLEXURE—THE STICK SLIP SOLUTION

Figure 6:
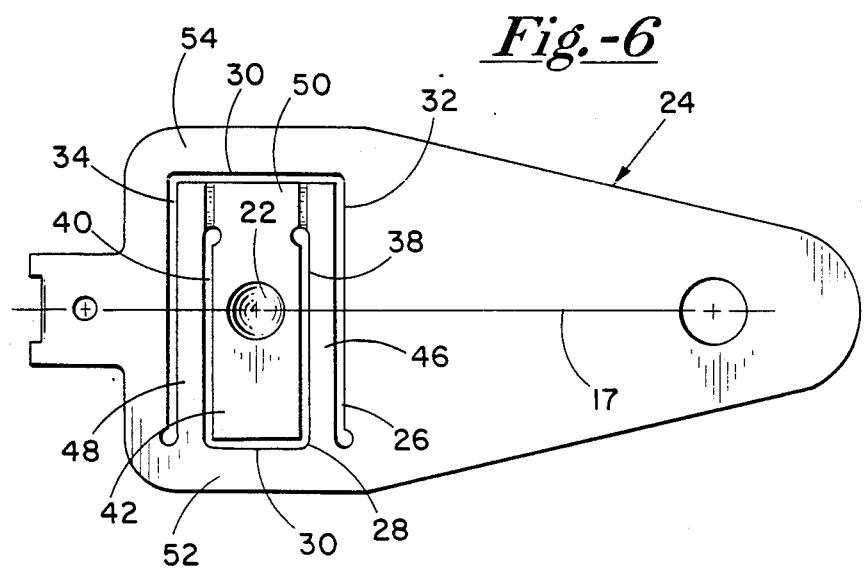
FIG. 6 is a plan view of the inventive flexure.

The higher stiffness flexure 24 for a rotary actuator is shown in FIGS. 1, 3 and 6. As seen in FIG. 3, the inventive flexure 24 is a thin piece of metal having both ends attached to the load arm 16. One end of the flexure 24 is attached near the end of the load arm 16 and the other end is attached in board from the end of the load arm 16.

Now turning to FIG. 6, the flexure 24 has a first U-shaped slot 26 and a second U-shaped slot 28. The first U-shaped slot 26 has a base portion 30 and two leg portions 32 and 34. The base 30 is essentially parallel to the longitudinal axis 17 of the load arm 16 and is located on one side of the load arm 16. The legs 32 and 34 are parallel to one another and both are perpendicular to the longitudinal axis 17 of the load arm 16.

The second U-shaped slot 28 is located within the U-shaped area defined by the first U-shaped slot 26. The second U-shaped slot 28 includes a base 36 and two legs, 38 and 40. The base 36 is parallel with the base 30 and is located on the other side of the load arm 16. The legs 38 and 40 are perpendicular to the base 36 and terminate before reaching the base 30 of the first U-shaped slot 26.

The U-shaped slot 28 defines within it a tongue 42. The slider 18 is attached to the tongue 42. The tongue 42 includes the gimbal dimple 22 which is a protrusion which contracts the arm 16 and serves as a point of rotation for the pitch and the roll axes of the slider 18.

The two U-shaped slots, 26 and 28, also form beams, which surround the tongue 42. Between the leg 32 and the leg 38, a cross beam 46 is formed. Similarly, between leg 34 and leg 40 another cross beam 48 is formed. Cross beams 46 and 48 are both perpendicular to the longitudinal axis 17 of the load arm. When the load arm 16 is started or stopped, the cross beams 46 and 48 are placed either in tension or compression due to the resultant angular acceleration.

A beam 50 connects the cross beam 46 and the cross beam 48. The beam 50 is located between the base 30 and the tongue 42. The beam 50 and cross beams 46 and 48 flex to allow the slider to pitch and roll to accommodate the variation in the topography of the disk 12. These components also provide the stiffness in several directions and about the several axes. A support beam 52 and a support beam 54 connect the two ends of the flexure and support the two U-shaped slots.

The various axes about whch stiffness is measured are shown in FIG. 1. These axes are the same regardless of the flexure used. Table 1 below compares the various stiffnesses of the current flexure 20 with the various stiffness of the inventive flexure 24.

TABLE 1

COMPARISON OF PERFORMANCE PARAMETERS*
OF THE DISCLOSED, INVENTIVE FLEXURE
AND THE CURRENT FLEXURE

|  | Current Flexure | Inventive Flexure |
| --- | --- | --- |
| Pitch stiffness | 1.55 in-gm/rad | 3.99 in-gm/rad |
| Roll stiffness | 2.27 in-gm/rad | 2.31 in-gm/rad |
| Yaw stiffness | 5.14 in-lb/rad | 4.54 in-lb/rad |
| Radial stiffness | 226 lb/in | 6045 lb/in |
| Timing stiffness | 11450 lb/in | 324 lb/in |

*The various stiffnesses are defined as shown in FIG. 1.

COMPARISON OF PERFORMANCE PARAMETERS

The comparison of the radial stiffness for each flexure about the radius through which the load arm 16 swings shows that the inventive flexure 24 has a larger radial stiffness than the flexure 20 mounted as shown in FIG. 2. A pair of beams 44, shown in FIG. 2, bend in flexure 20 to provide the radial stiffness when the gimbal dimple 22 slides off center. The cross beams 46 and 48 of the inventive flexure 24 are placed in either tension or comparison rather than bending when the load arm 16 swings to position the slider 18. By placing the cross beams in tension or compression the radial stiffness of the inventive flexure 24 is higher than the radial stiffness of the flexure 20.

For each flexure 20 and 24, the roll stiffness and the yaw stiffness are nearly the same. The timing stiffness of the inventive flexure drops in comparison to the flexure 20. The reduction in timing stiffness is not critical. The timing stiffness represents the resistance to motion along the track and changes in position of the slider 18 along a track will not cause read errors or other problems.

Table 1 also shows an increase in pitch stiffness. The increase in pitch stiffness, which is the stiffness about the pitch axis is not desirable. However, this increase in pitch stiffness does not prevent the slider 18 attached to inventive flexure 24 from adapting to variations in topography as it flies over the disk 12.

STACKING ERROR SENSITIVITY

Advantageously, the inventive flexure 24 is less sensitive to stacking error in the disk drive than the flexure 20. Stacking errors are variations in the distance between adjacent disks in the disk drive. Ideally, the distances between the adjacent disks in the disk drive should be equal and correspond to the distances between adjacent load arms in a disk drive. The ideal situation rarely occurs. The resultant stacking errors cause the load arms 16 in the disk pack to be deflected more or less than originally designed. This causes a greater or lesser normal force, $F_N$ (see FIG. 5), on the slider 18 since the load arm 16 is deflected more or less than originally designed. The change in the normal force, $F_N$, exerted on the slider produces a difference in the flying height during the operation of the disk drive.

The sensitivity to stacking error is determined by dividing the change in flying height in microinches by the change in the stack up distance in mils (0.001"). As shown in Table 2, a disk pack (not shown) using load arms with the inventive flexure 24 has a sensitivity value about one third the flying height sensitivity value of a load arm having the current flexure 20. The specific values are given in the following table.

TABLE 2

COMPARISON OF SENSITIVITIES OF A DISK DRIVE
USING THE INVENTIVE FLEXURE WITH
A 5-¼" DISK AND A DISK DRIVE
USING CURRENT FLEXURE WITH A 5-¼" DISK

Sensitivities (Partial Derivatives)

| Radius | Gimbal | Flying Height Sensitivity (Microinches/Thousandth of an Inch) |
| --- | --- | --- |
| 1.4 | Current | .03468 |
| 1.4 | Inventive | .02210 |
| 2.0 | Current | .03617 |
| 2.0 | Inventive | .01177 |
| 2.4 | Current | .05558 |
| 2.4 | Inventive | .03942 |

VIBRATION ISOLATION

Advantageously, the new flexure 24 is essentially isolated from two modes of vibration. FIG. 7 relates the ratio of the amplitude of the output to the amplitude of the input as it varies with respect to frequency for both the current flexure 20 and the inventive flexure 24. The ratio of the amplitude of the output to the input as a function of frequency for the current flexure 20 is shown as response curve 60. Response curve 62 shows the ratio of the amplitude of the output to the input as a function of frequency for the inventive flexure 24. A ratio of output amplitude to input amplitude of approximately 1.0 indicates rigid body movement; that is, the amplitude of the output equals the amplitude of the input.

Amplitude ratios greater than 1.0 indicate amplification and amplitude ratios less than 1.0 indicate attenuation. Resonance is indicated by maximums or peaks in the response curves 60 and 62. Amplification makes positioning the transducer in the slider 18 difficult due to excessive motion of the transducer. Attenuation makes the slider unresponsive. Rigid body motion is preferred over amplification or attenuation; consequently, a response curve near 1.0 is desirable.

FIG. 7 includes the response curve 60 for the current flexure 20 and the response curve 62 for the inventive flexure 24. By looking at FIG. 7, the resonance characteristics of the inventive flexure 24 and the current flexure 20 are easily compared. The current flexure 20, depicted by response curve 60, has three significant resonances. The ratio of the amplitude output to the amplitude of the input at the resonance frequencies has a value well above 1.0. By contrast, the inventive flexure 24 also has three resonances, however, only one is significant, that is only one resonance is well above the value of 1.0 for the ratio of the amplitude of output to the input.

A slight disadvantage is associated with inventive flexure 24 since the significant resonance occurs at a slightly lower frequency than the resonance having the largest amplitude in current flexure 20. This slight disadvantage is outweighed by the reduction in the number of significant resonances associated with the inventive flexure 24.

OTHER ADVANTAGES OF INVENTIVE FLEXURE

The inventive flexure 24 also has several less quantifiable advantages. The slider 18 is bonded to the tongue 42. The tongue 42 of the inventive flexure 24 straddles the load arm 16 making the bonding area much easier to inspect when compared to the current flexure 20. With the current flexure 20, the area to which the slider 18 is bonded is shielded by the load arm 16 making inspection more difficult.

The present invention and the best mode of practicing it have been described. It is to be understood that the foregoing description is illustrative only and that other means and techniques can be employed without departing from the full scope of the invention as described in the appended claims.

What is claimed is:

1. A rotary actuated arm assembly for positioning a transducer over a track of a magnetic disk comprising:
   an elongated load arm having a longitudinal axis;
   a slider which carries the transducer over the track of a magnetic disk;
   a flexure attached to the load arm and the slider attached to the flexure, the flexure allowing the slider to maintain a substantially constant height between the slider and the disk as the slider passes over the magnetic disk; and wherein the flexure comprises a thin piece of metal having two ends and having:
   a first U-shaped opening therein having a base substantially parallel to the longitudinal axis of the load arm and having two legs parallel to each other and perpendicular to the longitudinal axis of the load arm; and
   a second U-shaped opening therein having a base substantially parallel to the longitudinal axis of the load arm and having two legs parallel to each other and perpendicular to the longitudinal axis of the load arm, the second U-shaped opening located within the area bounded by the first U-shaped opening, wherein the slider is attached to the area bounded by the second U-shaped opening, both ends of the thin piece of metal attached to the load arm.

2. The flexure of claim 1 wherein the base of the first U-shaped opening is located on one side of the longitudinal axis of the load arm and the base of the second U-shaped opening is located on the other side of the longitudinal axis of the load arm.

3. The flexure of claim 1 wherein the area within the second U-shaped opening includes a rounded protrusion for contacting the load arm to allow the slider to pivot to accommodate the variations in the topography of the magnetic disk.

4. The flexure of claim 3 having a stiffness in a direction substantially perpendicular to the longitudinal axis of the load arm which produces the restorative force in response to the protrusion sliding on the load arm.

5. The flexure of claim 4 having a stiffness sufficient to make the restorative force greater than the friction force between the protrusion and the load arm when the transducer carried by the slider moves off track.

6. A magnetic arm assembly for flying a slider over a magnetic disk comprising:
   an elongated load arm having a longitudinal axis; and
   a flexure having two ends, both ends attached to the load arm, the flexure further comprising:
   a support beam which substantially parallels the longitudinal axis of the load arm;
   a first cross beam;
   a second cross beam, the first and second cross beams substantially perpendicular to the support beam and each having one end attached to the support beam;
   a free end beam substantially parallel to the support beam, the other end of each of said first and second cross beams attached to said free end beam; and
   a tongue having an end attached to said free end beam, wherein the slider is attached to the tongue.

7. The magnetic arm assembly of claim 6 wherein the slider carries a transducer over a desired track on the disk and wherein the flexure allows the slider to accommodate height variations on the disk, and produces forces to resist motion of the slider relative to the load arm and to reposition the slider before the transducer moves to a position where read errors would result.

8. The magnetic arm assembly of claim 7 wherein the tongue includes a gimbal dimple which contacts the load arm and provides pitch and roll axes for the slider.

9. The magnetic arm assembly of claim 6 wherein the support beam and the cross beams flex to allow the slider attached thereto to maintain a substantially uniform height between the slider and the rotating magnetic disk, the slider carrying a transducer over a desired tack on the disk.

10. The magnetic arm assembly of claim 6 wherein the cross beams and the tongue are attached to said free end beam along one edge of the free end beam, the tongue positioned between the cross beams.

11. The magnetic arm assembly of claim 9 wherein the flexure has a stiffness along the radius through which the load arm rotates which produces a restorative force after the gimbal dimple moves relative to the load arm, the restorative force being larger than the friction force between the gimbal dimple and the load arm when the transducer is moved from a position over the desired track.

12. A suspension assembly for a slider comprising:
   a fixed arm;
   an elongated load arm attached to the fixed arm; and
   a flexure attached to the load arm, the flexure further including:
   a first side beam, located on one side of the load arm parallel to the longitudinal axis of the load arm;
   a second side beam substantially parallel to the longitudinal axis of the load arm and to the first side beam, the second side beam located on the other side of the load arm;
   two cross beams parallel to each other and both substantially perpendicular to the longitudinal axis of the load arm, both cross beams having one end attached to the first side beam and having the other end attached to the second side beam; and
   a rectangular tongue located between the two cross beams, the rectangular tongue having one edge attached to the second side beam and having a dimple therein which contacts the surface of the load arm.

13. The suspension assembly of claim 12 wherein the free end of the tongue terminates near the first side beam.

14. The suspension assembly of claim 13 wherein a slider having a pair of rails is attached to the tongue, the slider oriented so that the rails are substantially parallel with the longitudinal axis of the arm.

15. The suspension of claim 12 wherein both ends of the flexure are attached to the load arm.

16. A data storage device comprising:
   a plurality of disks, each disk spaced from the adjacent disk; and
   a plurality of rotary actuated magnetic arm assemblies, pairs of said rotary actuated magnetic arm assemblies located between pairs of adjacent disks, said plurality of magnetic arm assemblies rotated into position to read and write data, the rotary actuated arm assemblies including:
   a fixed arm portion;
   a load arm portion attached to the fixed arm;
   a flexure attached to the load arm, the flexure further including:
   a first side beam, located on one side of the load arm parallel to the longitudinal axis of the load arm;
   a second side beam substantially parallel to the longitudinal axis of the load arm and to the first side beam, the second side beam located on the other side of the load arm;
   two cross beams parallel to each other and both substantially perpendicular to the longitudinal axis of the load arm, both cross beams having one end attached to the first side beam and having the other end attached to the second side beam; and
   a rectangular tongue located between the two cross beams, the rectangular tongue having one edge attached to the second side beam and having a dimple therein which contacts the surface of the load arm; and
   a slider attached to the flexure, the slider carrying a transducer, the flexure allowing the slider to maintain a substantially constant flying height over the disk, and producing a force to reposition the slider after the dimple moves with respect to the load arm to prevent the transducer from flying in a position where read errors occur.

17. The data storage device of claim 17 wherein the distance between a pair of adjacent disks and the distance between a pair of magnetic arm assemblies which are located between the pair of adjacent disks may differ, the flexure changing the flying height of a slider in response to a difference in distance between a pair of disks and between a pair of magnetic arm assemblies at a rate of less than 0.3950 microinches/thousandth of an inch difference in distance at a radius of 2.4 inches and at a rate of less than 0.2300 microinches/thousandth of an inch difference in distance at a radius of 1.4 inches.

18. The data storage device of claim 16 wherein the flexure is substantially isolated from two modes of vibration, the ratio of the amplitude output to the amplitude input less than 2.0 when the flexure resonates in these two modes.

* * * * *